Feb. 27, 1951 E. MORF 2,543,328

SHOCK-ABSORBING BEARING

Filed Aug. 23, 1944

Inventor
E. Morf
By Glascock Downing & Seebold
Attys.

Patented Feb. 27, 1951

2,543,328

UNITED STATES PATENT OFFICE 2,543,328

SHOCK-ABSORBING BEARING

Ernest Morf, La Chaux-de-Fonds, Switzerland

Application August 23, 1944, Serial No. 550,796
In Switzerland April 21, 1944

6 Claims. (Cl. 58—140)

1

The invention relates to shock absorbing bearings particularly but not exclusively for watches of the kind having a pierced member receiving the shaft of a mover, this pierced member being mounted on a member capable of tilting under the effect of a shock and being brought back into normal position by a spring. Bearings of this type are shown in my pending application Serial No. 501,871, now patented under No. 2,455,081, granted November 30, 1948. In the shock absorbing bearing according to the invention, the lower extension of the member rests on the bottom of a cavity provided on a bearing support, the contact between this extension and the bottom of the cavity taking place along one circular edge only.

This arrangement has various advantages. A saving in height of the member may be obtained and the bearing can be built in such a way that it is less sensitive to small shocks without being less efficacious in the case of shocks dangerous to the shaft to be protected.

The accompanying drawing illustrates, by way of examples, two embodiments of the shock absorbing bearing according to the invention.

Figure 1:
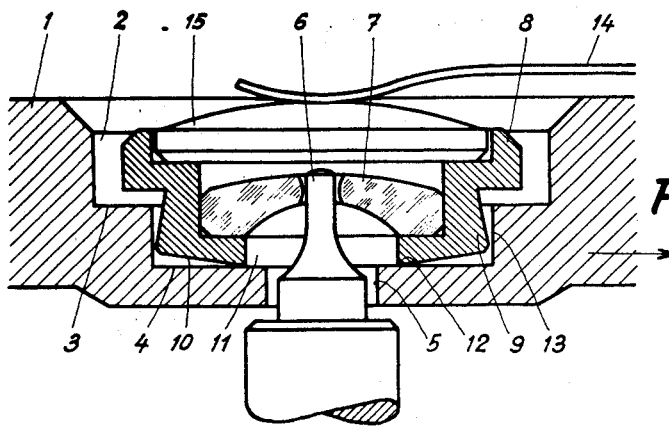
Figs. 1 and 2 are axial sections through the first example.
Figure 2:
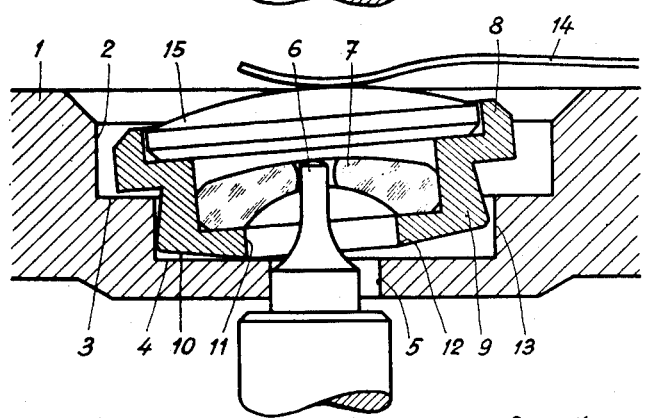

Referring now to Figures 1 and 2 the cock 1 supporting the bearing has a cavity 2 with a rim 3 and a bottom 4. Through a hole 5 of this latter passes the pivot 6 of the movable member to be protected and the pivot also entering the pierced jewel 7. This latter is driven into a member 8 having an extension 9 with an end face 10 in the form of a truncated cone. This extension is placed freely in the narrowest part of the cavity 2. The extension 9 has a hole 11 with a lower edge 12, by which the member 8 is supported on the bottom 4 of the cavity. The exterior of the extension 9 is likewise conical so that there is sufficient room between the wall 13 of the cavity 2 and the extension 9 whereby, when a shock in the direction of the arrow 20 occurs, the different parts can take the relative position tilted about a point on the lower edge 12 as shown in Fig. 2, where the axle of the movable member to be protected makes contact with the wall of the hole 5 in the bottom of the cavity. In this position, no danger whatever exists for the pivot 6.

When subjected to mild shock not dangerous to the pivot, the outer edge of extension 9 is moved into contact with the wall 13 and the resistance thus offered prevents tilting movement of the pierced jewel. On the other hand, when the shock is so great as to be dangerous, the member 8 tilts and tensions the spring 14 which by means of the cap jewel 15, normally keeps the member 8 in correct position.

Figure 3:
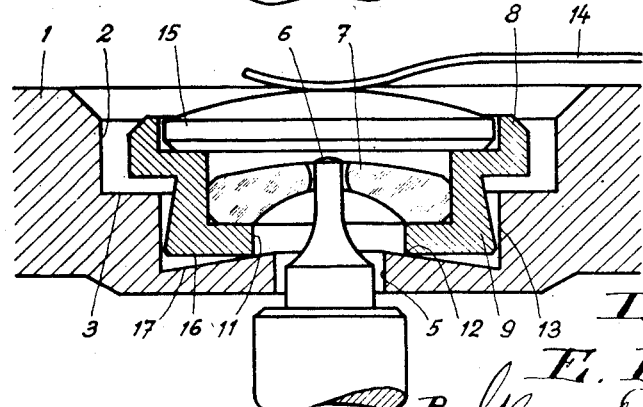
Fig. 3 is an axial section through the second embodiment.

In the embodiment illustrated in Fig. 3 the end face 16 of the extension 9 is perpendicular to the axis of the hole of the pierced jewel 7. The bottom 17 of the cavity 2 is conical so that, here too, contact between this bottom and the extension only takes place along the circular edge 12. This device works in the same manner as that of the preceding embodiment. In the above examples the cavity is provided on a cock on which the bearing is supported, but it will be understood that this cavity might be provided in any other piece which may, for instance, serve as coverplate adjusted on the cock.

It is therefore clear that I have provided an arrangement in which the shaft which has a diameter less than the diameters of the apertures in the bottom of the supporting member and the bottom of the cup-shaped member passes through these apertures and is received within the pierced portion of the pierced jewel and as shown the shaft extends through this pierced portion at least beyond the midpoint of the thickness of the pierced jewel at its pierced portion. Inasmuch as the aperture in the bottom of the cup-shaped member is of larger diameter than the diameter of the aperture in the bottom of the supporting member the cup-shaped member is supported thereby and in turn supports the pierced member. Basically, therefore, in order to provide for tilting movement of the cup-shaped member relative to the supporting member under excessive shock the invention comprehends means incorporated with the respective mutually facing surfaces of the bottom of the cup-shaped member and the bottom of the supporting member that define a line contact between the members and this line contact is closer to the axis of the shaft than the distance vertically between the line of contact and the area of the shaft received within and adjacent the top of said pierced member at the mid-thickness thereof.

What I claim is:

1. In an apparatus, a supporting member having an apertured bottom and cylindrical walls extended therefrom, a shaft having a diameter less than the diameter of the aperture in the bottom and extending through the said aperture, a cup-shaped member loosely disposed within the confines of said walls and having an apertured bottom, the aperture in the bottom of the cup-shaped member having a diameter greater than the diameter of the first-mentioned aperture, said shaft passing through said second-mentioned aperture, a pierced member receiving said shaft and supported by said cup-shaped member, said shaft extending into said pierced member at least to a point beyond the mid point of its thickness at the pierced portion, and the mutually facing surfaces of the bottom of the cup-shaped member and the bottom of the supporting member being angularly disposed with relation to one another whereby the cup-shaped member is supported on a line of contact defined by the edge of the aperture therein and said line of contact being closer to the axis of the shaft than the distance vertically between the line of contact and the area of the shaft received within the pierced member at the mid-thickness thereof to provide for tilting movements of the cup-shaped member relative to the supporting member under excessive shock.

2. In an apparatus as defined in and by claim 1 and the apertured bottom of the cup-shaped member defining in section an outer peripheral edge and an inner edge defining the aperture and a surface extending at an angle downwardly from the outer edge to the inner edge and in which the mutually facing surface of the supporting member is a planar surface.

3. In an apparatus as defined in and by claim 1 and in which the bottom surface of the cup-shaped member is a planar surface and the mutually facing bottom surface of the supporting member defines in section an outer edge adjacent the cylindrical walls and an inner edge defining the edge of the aperture therein and a surface extending at an angle upwardly from said outer edge to said inner edge.

4. In an apparatus as defined in and by claim 1 and resilient means normally urging said cup-shaped member into line contact with the bottom of said supporting member.

5. In an apparatus as defined in and by claim 1 and in which the wall surfaces of said cup-shaped member are undercut to provide in section an angular surface extending inwardly from the bottom toward the top of the walls and thus being in angular relation with respect to the said cylindrical wall of the supporting member.

6. In an apparatus, a supporting member having an apertured bottom and cylindrical walls extended therefrom, a shaft having a diameter less than the diameter of the aperture in the bottom and extending through the said aperture, a cup-shaped member loosely disposed within the confines of said walls and having an apertured bottom, the aperture in the bottom of the cup-shaped member having a diameter greater than the diameter of the first-mentioned aperture, said shaft passing through said second-mentioned aperture, a pierced member receiving said shaft and supported by said cup-shaped member, said shaft extending into said pierced member at least to a point beyond the mid point of its thickness at the pierced portion, and means incorporated with the respective mutually facing surfaces of the bottom of the cup-shaped member and the bottom of the supporting member defining a line contact between the members and said line contact being closer to the axis of the shaft than the distance vertically between the line of contact and the area of the shaft received within and adjacent the top of said pierced member at the mid thickness thereof to provide for tilting movements of the cup-shaped member relative to the supporting member under excessive shock.

ERNEST MORF.

REFERENCES CITED

The following references are of record in the file of this patent:

UNITED STATES PATENTS

| Number | Name | Date |
|---|---|---|
| 448,896 | Villon | Mar. 24, 1891 |
| 2,015,905 | Marti | Oct. 1, 1935 |
| 2,219,068 | Colomb | Oct. 22, 1940 |
| 2,239,682 | Marti | Apr. 29, 1941 |